Figure 6:
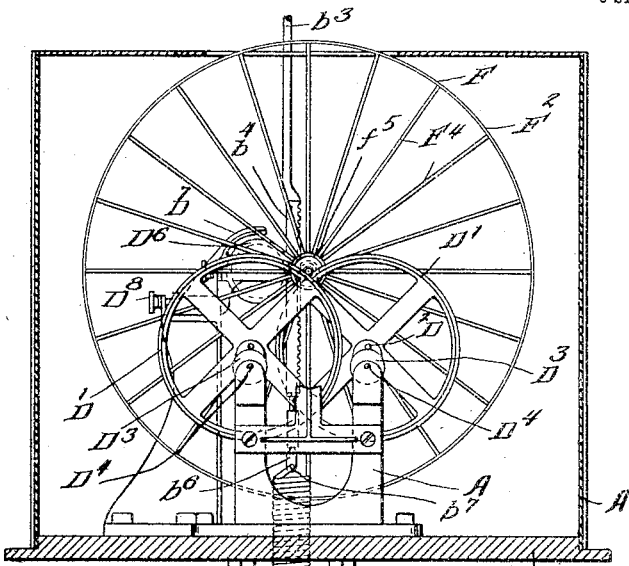

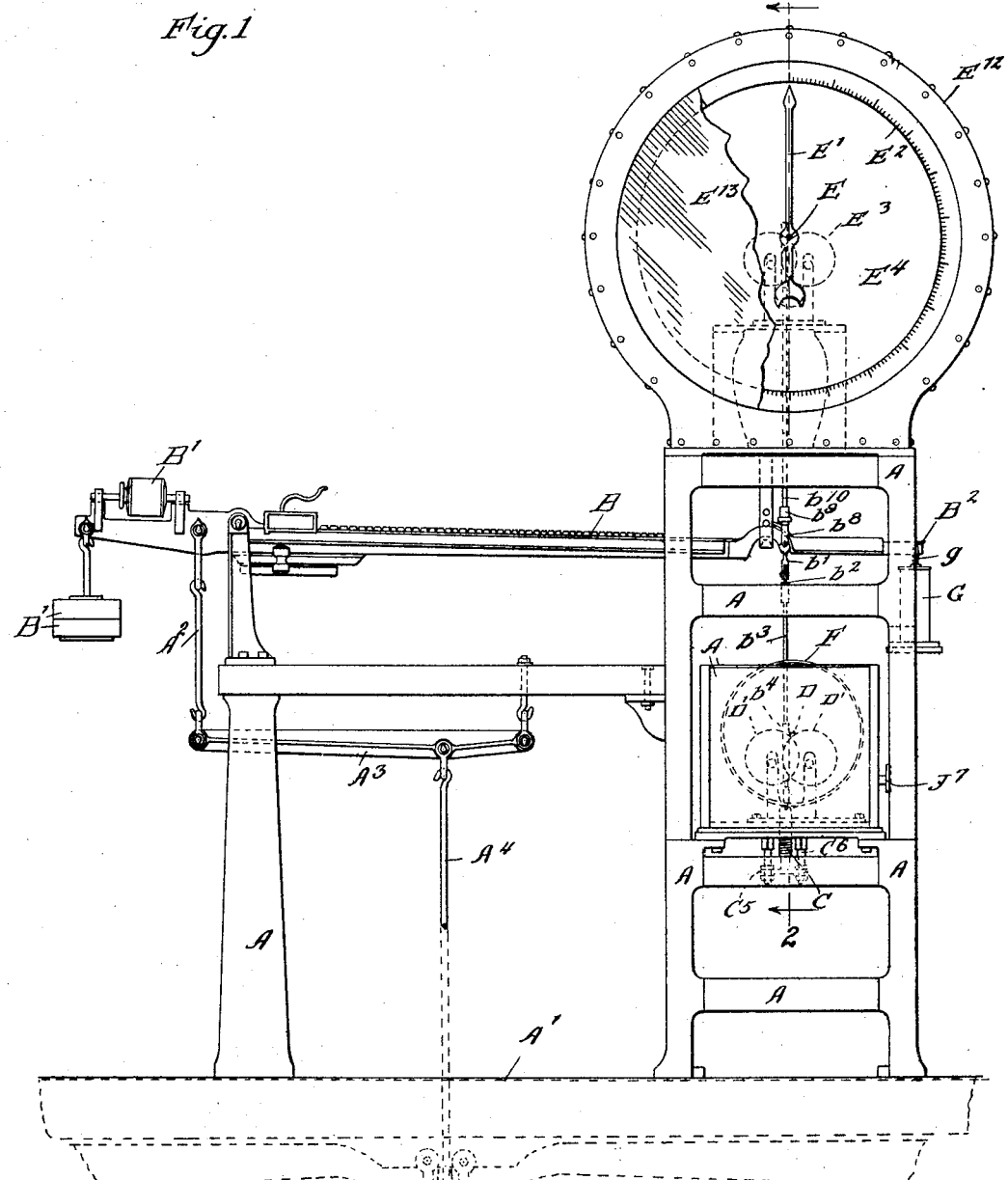

No. 778,358. PATENTED DEC. 27, 1904.
G. GOETZ.
COMBINED WEIGHT INDICATING AND WEIGHT RECORDING SCALE.
APPLICATION FILED MAR. 7, 1904.
6 SHEETS—SHEET 2.
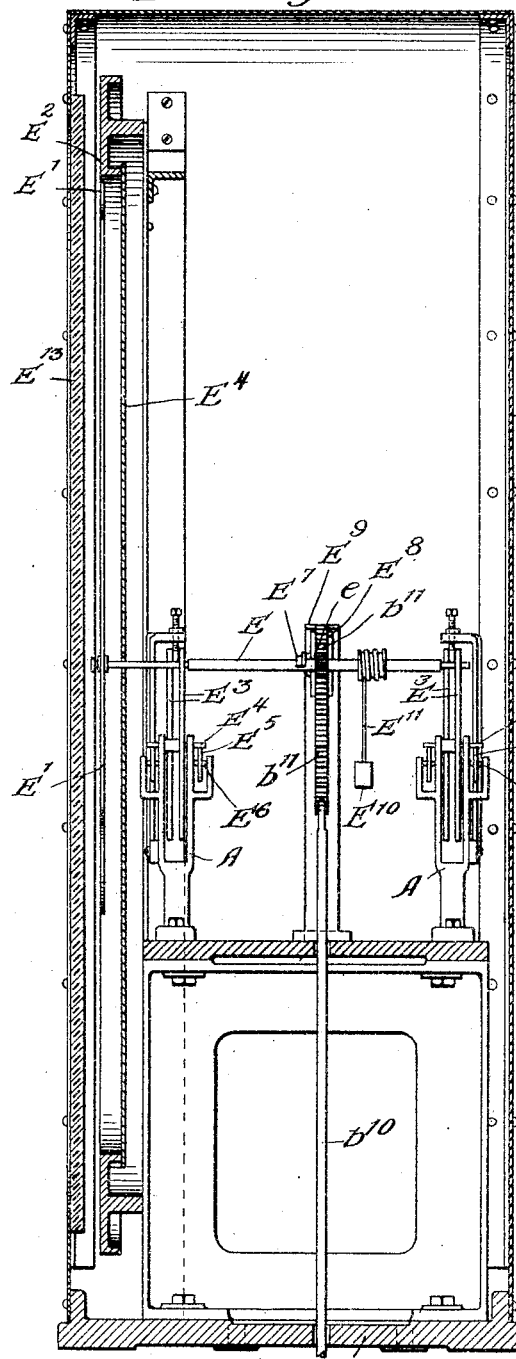
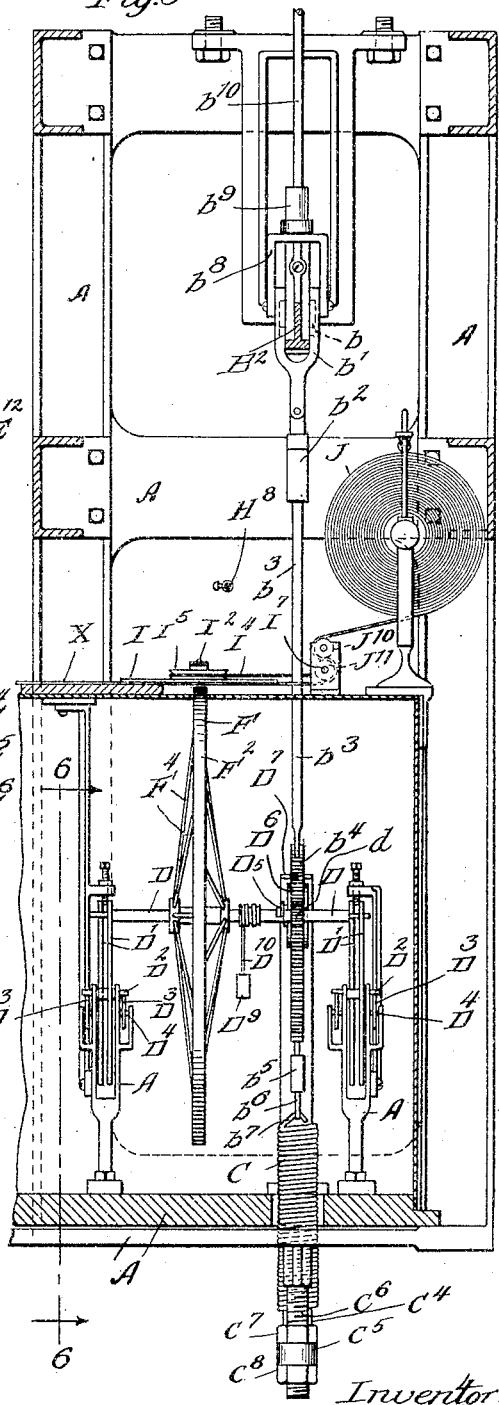
Witnesses:
Wm. Geiger
H. W. Munday
Inventor:
George Goetz
By Munday, Evarts & Adcock
Attorneys No. 778,358. PATENTED DEC. 27, 1904.
G. GOETZ.
COMBINED WEIGHT INDICATING AND WEIGHT RECORDING SCALE.
APPLICATION FILED MAR. 7, 1904.
6 SHEETS—SHEET 3.
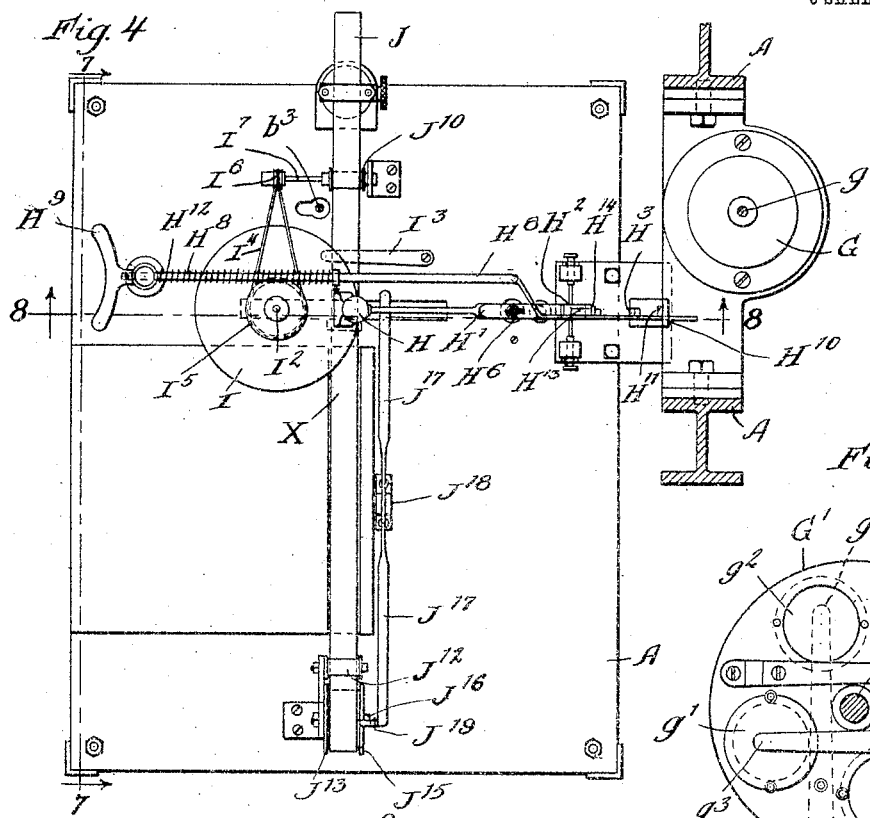
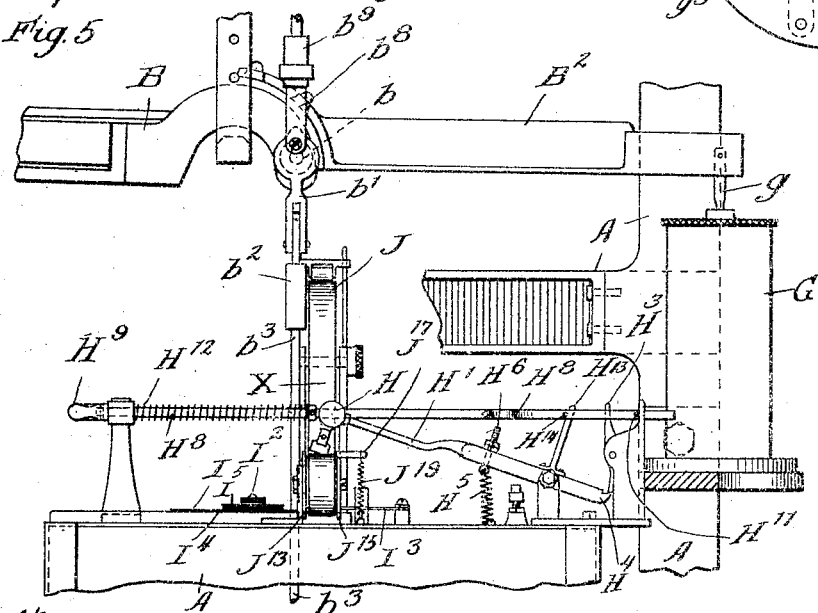
Witnesses:
Wm Geiger
Inventor:
George Goetz
By Munday, Evarts & Adcock
Attorneys No. 778,358. PATENTED DEC. 27, 1904.
G. GOETZ.
COMBINED WEIGHT INDICATING AND WEIGHT RECORDING SCALE.
APPLICATION FILED MAR. 7, 1904.

6 SHEETS—SHEET 4.

Witnesses:
Wm. Geiger
H. W. Munday

Inventor:
George Goetz
By Munday, Evarts & Adcock
Attorneys

No. 778,358. PATENTED DEC. 27, 1904.
G. GOETZ.
COMBINED WEIGHT INDICATING AND WEIGHT RECORDING SCALE.
APPLICATION FILED MAR. 7, 1904.
6 SHEETS—SHEET 5.
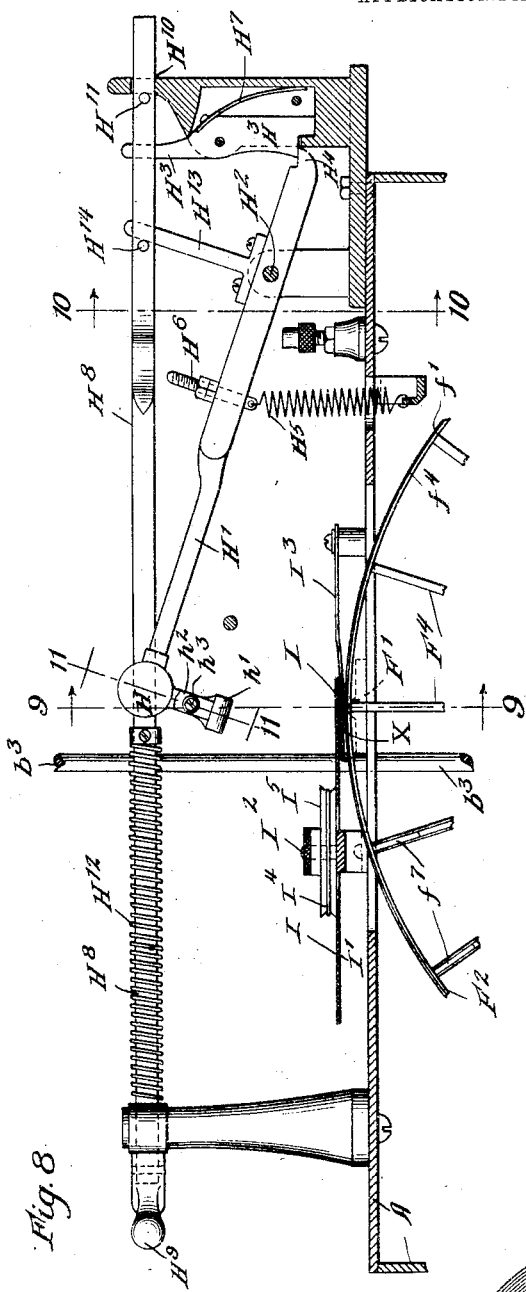
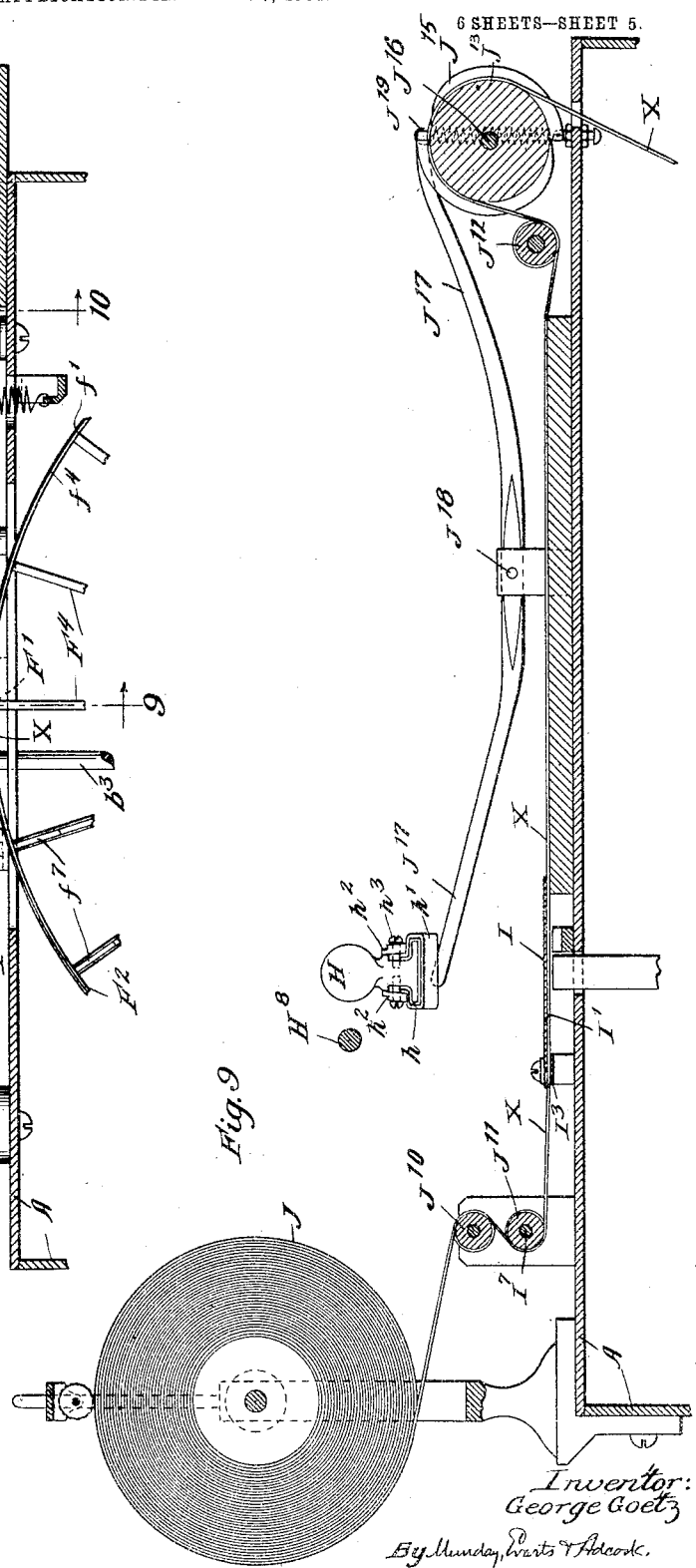
Witnesses:
Wm. Geiger
H. W. Munday
Inventor:
George Goetz
By Munday, Evarts & Adcock.
Attorneys No. 778,358. PATENTED DEC. 27, 1904.
G. GOETZ.
COMBINED WEIGHT INDICATING AND WEIGHT RECORDING SCALE.
APPLICATION FILED MAR. 7, 1904.

6 SHEETS—SHEET 6.

Witnesses:
Wm. Geiger
A. W. Munday

Inventor:
George Goetz
By Munday, Evarts & Adcock.
Attorneys

No. 778,358.
Patented December 27, 1904.

UNITED STATES PATENT OFFICE.

GEORGE GOETZ, OF CHICAGO, ILLINOIS, ASSIGNOR TO STREETER-AMET WEIGHING AND RECORDING COMPANY, OF CHICAGO, ILLINOIS, A CORPORATION OF ILLINOIS.

COMBINED WEIGHT-INDICATING AND WEIGHT-RECORDING SCALE.

SPECIFICATION forming part of Letters Patent No. 778,358, dated December 27, 1904.

Application filed March 7, 1904. Serial No. 196,975.

*To all whom it may concern:*

Be it known that I, GEORGE GOETZ, a citizen of the United States, residing in Chicago, in the county of Cook and State of Illinois, have invented a new and useful Improvement in a Combined Weight-Indicating and Weight-Recording Scale, of which the following is a specification.

My invention relates to improvements in scales, and more particularly to improvements in weight printing or recording scales.

The object of my invention is to provide a combined weight-indicating and weight printing or recording scale of a simple, efficient, and durable construction by means of which loads or objects may be accurately and rapidly weighed and the weights thereof both indicated to the attendant and printed or recorded upon a record tape or slip of paper.

My invention consists in the means I employ to practically accomplish this object or result, as herein shown and described—that is to say, it consists in connection with a scale-platform and scale-beam, having an extension or arm secured thereto, of a dash-pot cylinder and piston connected to the scale-beam extension or arm and furnished with upwardly and downwardly opening valves in the piston, a counterbalance tension-spring, a rack connecting the scale-beam with the spring, a rotatable shaft having a gear meshing with the rack, a weight-printing type-wheel on the shaft, a supplemental rack connected with the first-mentioned rack, a weight-indicator finger on a supplemental shaft having a gear meshing with said supplemental rack, a stationary circular graduated index in coöperative relation with the upright indicator-finger, a stationary pointer-mark printing-type adjacent to the type-wheel, an impression-hammer, an impression-hammer lever, a trigger for holding the impression-hammer lever in its elevated position, a spring for actuating the impression-hammer, a hand slide or device for raising the impression-hammer lever and releasing the trigger when the scale comes to a true balance, a feed-reel, take-up reel, and guide-roller for the recording-type or paper strip in coöperative relation with the type-wheel, a motor for actuating the take-up reel, a notched disk or cam, and lever mechanism for controlling the forward feed of the paper strip or recording-tape, a carbon or other printing disk interposed between the type-wheel and stationary printer-type and the impression-hammer, whereby the weight of the load or object being weighed may be both indicated to the attendant by the pointer-finger on the stationary circular index and recorded by the type-wheel and stationary pointer-type on the paper strip or recording-tape.

My invention also consists in the novel construction of parts and devices and in the novel combinations of parts and devices herein shown or described.

Figure 7:
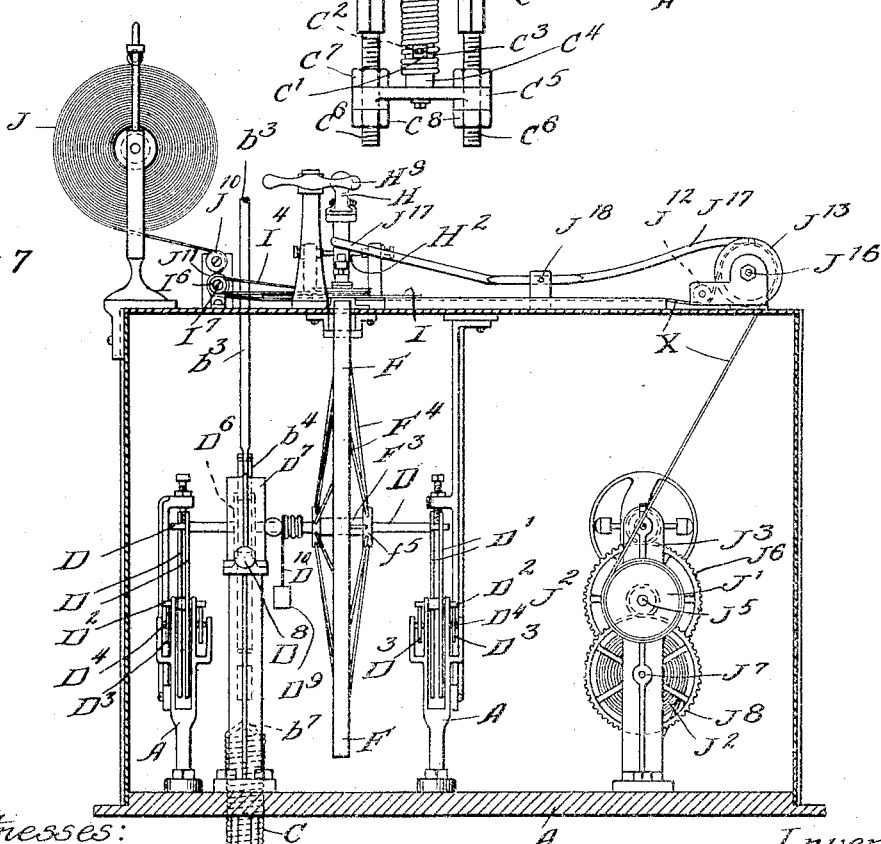
Figure 10:
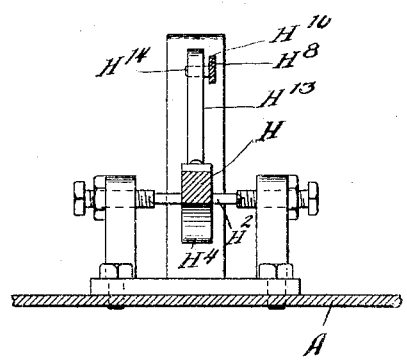
Figure 11:
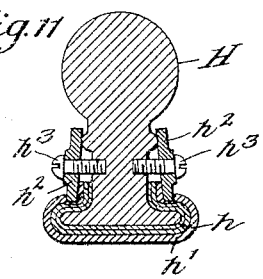
Figure 12:
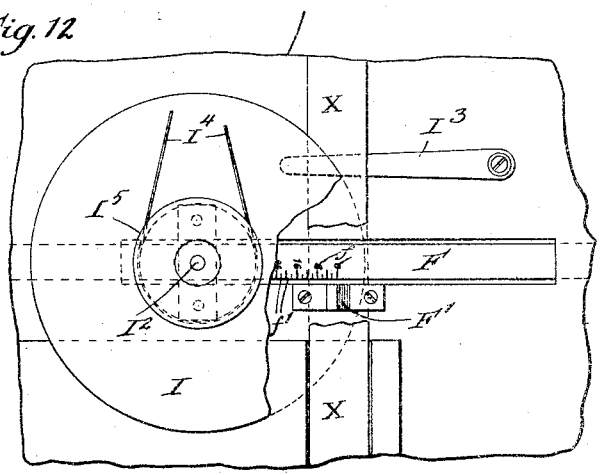
Figure 13:
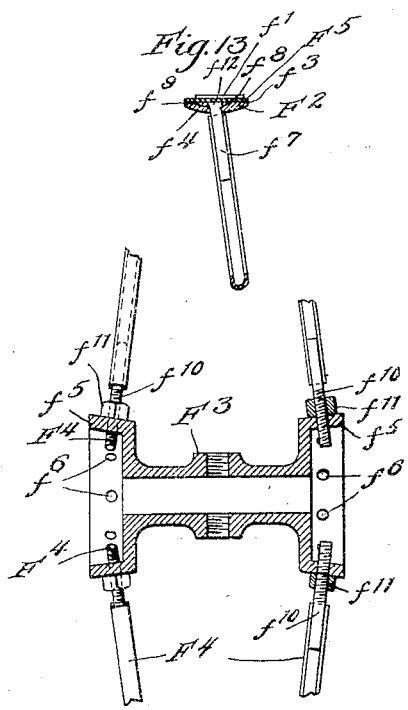
Figure 14:
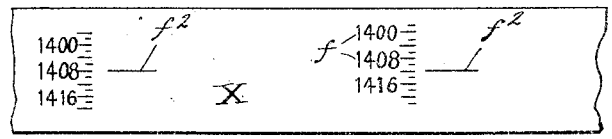

In the accompanying drawings, which form a part of this specification, Figure 1 is a side elevation of a combined weight-indicating and weight printing or recording scale embodying my invention. Figs. 2 and 3, taken together, are enlarged vertical sections on the line 2 2 of Fig. 1. Fig. 4 is a detail plan view, partly in horizontal section. Fig. 5 is a detail side elevation showing the end of the scale-beam, impression-hammer, and other adjacent parts. Fig. 6 is a detail section on line 6 6 of Fig. 3. Fig. 7 is a vertical section on line 7 7 of Fig. 4. Fig. 8 is an enlarged section on line 8 8 of Fig. 4. Fig. 9 is a section on line 9 9 of Fig. 8. Fig. 10 is a section on line 10 10 of Fig. 8. Fig. 11 is a section on line 11 11 of Fig. 8. Fig. 12 is a detail plan view showing the carbon or other printing disk and adjacent parts. Fig. 13 is a detail radial section of the printing-wheel, showing its construction. Fig. 14 is a detail view showing a short section of the recording-tape or paper strip upon which the weights are printed or recorded, and Fig. 15 is a detail plan view of the dash-pot valve.

In the drawings like letters of reference indicate like parts throughout all the figures.

In the drawings, A represents the frame; A', the scale-platform; $A^2$, the link connecting the scale-platform or its levers with the scale-beam B through the intermediate scale-lever A$^3$ and connecting-link A$^4$. The scale-beam B is provided with the customary counterpoise-weights B' B', which, however, are used simply for balancing the scale and not for balancing or weighing the load or object to be weighed, as this is done by a counterbalance-spring C. The counterbalance-spring C is connected to the scale-beam B near the outer or free end thereof through a knife-edge bearing $b$, clevis $b'$, adjustable screw-threaded coupling $b^2$, connecting-rod $b^3$, rack $b^4$, adjustable screw-threaded coupling $b^5$, clevis $b^6$, and hook $b^7$, which is integral with the spring C. The rack $b^4$ meshes with the gear $d$ on the printing-wheel shaft D. The clevis $b'$ is connected by a clevis $b^8$, screw-threaded adjustable coupling $b^9$, and connecting-rod $b^{10}$ with a supplemental rack $b^{11}$, that meshes with a gear $e$ on the indicator-finger shaft E. The counterbalance-spring C is connected at its lower end through an adjustable clamp C', having an eye C$^2$, through which one coil of the spring is threaded, and a set-screw C$^3$, with a guide plug or stem C$^4$, which is secured to an adjustable bracket C$^5$, attached to the frame A through the screws C$^6$, and which bracket may be adjusted up and down by the threaded nuts C$^7$ C$^8$. By turning the tension-adjusting clamp C' the operative length of the spring may be varied or adjusted as required. By moving the adjustable bracket C$^5$ up or down the tension of the spring may be further adjusted without changing its operative length. By turning the adjustable screw-coupling $b^2$ the position of the rack $b^4$ in respect to the scale-beam and in relation to the type-wheel may be adjusted as required. By turning the adjustable screw-coupling $b^5$ the position of the rack in relation to the counterbalance-spring and type-wheel may be adjusted as required. By turning the adjustable screw-coupling $b^9$ the position of the rack $b^{11}$ in relation to the scale-beam, pointer-finger E', and stationary circular index E$^2$ may be adjusted as required.

The scale-beam B is provided with an extension or arm B$^2$ at its outer or free end, to which is connected the piston G' of a dash-pot cylinder G through the connecting-link $g$. The dash-pot piston G' is provided with one or more, preferably two, large upwardly-opening valves $g'$ and one or more, preferably two, large downwardly-opening valves $g^2$, said valves being held normally closed by light flat springs $g^3$, so that the piston may move freely until the scale-beam nears its position of a true balance for the load being weighed and at the same time move steadily and without vibration to its position of true balance.

The printing-wheel shaft D, which carries the printing or type wheel F, is journaled on antifriction-wheels D', the shafts D$^2$ of which are journaled on antifriction-wheels D$^3$, having shafts D$^4$, which are journaled on the frame A. An adjustable guard D$^5$ keeps the shaft D in position between the antifriction-wheels D' D'.

A flanged guide wheel or roller D$^6$, mounted on an adjustable bracket D$^7$, having an adjusting-screw D$^8$, serves to guide the reciprocating rack $b^4$ without interfering with its free movement or occasioning appreciable friction thereon.

The weight-indicator shaft E is journaled on antifriction-wheels E$^3$, the shafts E$^4$ of which are journaled on antifriction-wheels E$^5$, having shafts E$^6$, which are journaled on the frame A. An adjustable hook-guard E$^7$ keeps the shaft E in position between the antifriction-wheels upon which it rests. A flanged roller E$^8$, mounted on an adjustable bracket E$^9$, keeps the rack $b^{11}$ in proper mesh with the gear $e$ on the pointer or indicator finger shaft E. A counterweight E$^{10}$, connected by a cord E$^{11}$ with the pointer-shaft E, around which the cord is wrapped, serves to counterbalance or neutralize the friction, inertia, or resistance incident to the movement of the pointer-finger and its shaft and connecting parts.

A counterweight D$^9$, connected by a cord D$^{10}$ with the type-wheel shaft D, around which said cord is wound, serves to counterbalance or neutralize the inertia, friction, or resistance incident to the movement of the type-wheel F and its shaft D and connected parts.

The weight-indicating finger or pointer E' and circular graduated index E$^2$ are inclosed in a case E$^{12}$, having a glass front E$^{13}$.

The printing or type wheel F is furnished with type $f$ on its periphery for printing successive numbers at equal or graduated distances apart to indicate the weight in pounds, tens of pounds, or hundreds of pounds, according as the loads to be weighed are light or heavy. The type-wheel F is also furnished with graduation-mark type $f'$ on its periphery between successive numbers to indicate weights between those indicated by successive numbers, there being preferably four graduation-mark type $f'$ between successive numbers.

F' is a stationary pointer-mark type fixed on the stationary frame of the machine adjacent to the type-wheel F to indicate the weight by its pointer-mark print $f^2$ on the paper strip X in conjunction with the numerals $f^3$, printed on the paper strip X by the type-wheel.

As the printing is done on the paper strip by an impression-hammer H, which strikes a blow against the type-wheel F and stationary pointer-mark type F' when the type-wheel comes to a true balance, it is very important in order to accomplish the result of exact and accurate weighing and recording that the type-wheel F should be of true circular form and accurately and truly balanced about the axis on which it turns as a center in respect to all parts of its circumference and that the wheel itself and its rim should be of sufficient stiffness, rigidity, and strength to properly withstand the blows of the impression-hammer and at the same time maintain or preserve its true circular shape and its true balance about the axis on which it turns in respect to all points of its circumference, while at the same time the wheel as a whole is so light that its weight or inertia and its consequent momentum when under motion will not interfere with its being brought to the necessary delicate and true balance to correctly indicate the weight of the load being weighed, and this quickly and with certainty, so that loads may be rapidly weighed. To meet these essential conditions, and thus adapt the type-wheel for practical cooperation with the other cooperating parts, I construct the type-wheel with a light steel rim $F^2$, having a plain or flat outer peripheral face $f^3$ and a curved inner face $f^4$ in cross section, and with a brass hub $F^3$, having spoke-flanges $f^5$, furnished with a series of screw-threaded spoke-holes $f^6$ to receive the inner threaded ends of the spokes $F^4$. The spokes $F^4$ consist of light stiff trough-shaped or umbrella-rib pieces of steel furnished at their outer ends with soft steel or iron rivet pieces or pins $f^7$ brazed thereto and adapted to be inserted in suitable holes $f^8$ in the steel rim $F^2$ and secured thereto by riveting or upsetting. The rivet pins or plugs $f^7$ have shouldered ends $f^9$ to fit in the holes $f^8$ in the rim $F^2$, so that the spokes can be turned in the rim while the rim and hub and spokes are being adjusted in respect to each other by means of the screw-threaded pins $f^{10}$ at the opposite or inner ends of the spokes. The screw-threaded pins $f^{10}$ at the inner ends of the trough-shaped or umbrella-rib spokes are brazed thereto and provided with screw-threaded lock or jam nuts $f^{11}$, which are adapted to bear against the outer periphery of the spoke-flanges $f^5$ on the hub $F^3$ of the wheel. In assembling the wheel the meeting ends of the rim $F^2$ are securely brazed together and the rim brought approximately to a true circular shape. The jam-nuts being first applied to the spokes, the spokes are next inserted in the hub and in the holes in the rim, the spokes being at this time free to turn in the spoke-holes in the rim. The spokes are then adjusted to put them all under tension and bring the rim to approximately true circular shape and the hub to approximately true central position in respect to the wheel. The spokes are then loosely tightened in the rim, so that they are approximately tight therein, but still capable of being slightly turned, as may be necesary for final adjustment. After the spokes are thus approximately tightened in the rim the wheel is given a final adjustment by turning the spokes and the rim brought to true circular shape and the hub to true central position, and while the parts of the wheel are firmly clamped in this position the jam-nuts are tightened against the spoke-flanges of the hub, thus locking the spokes against twisting or turning, and the ends of the spokes are then again and finally tightened in the rim of the wheel by upsetting or riveting. The first upsetting or riveting operation on the ends of the spokes forms an outer or tensile-acting head $f^{12}$ on the ends of the spoke to exert the necessary inward or radial pulling action on the rim, while the shoulder $f^9$ on the spoke gives the necessary outward or radial pushing action on the rim, while leaving the spoke at the same time capable of being turned to screw its threaded end $f^{10}$ in or out of the threaded spoke-flange $f^5$ on the hub, as may be required. After the hub is thus centered and the rim of the wheel brought to true circular shape the wheel is next carefully balanced as to all parts of its circumference, this being done by grinding or filing off small quantities of metal at different parts of the circumference of the wheel, as may be required, or, if necessary, adding to certain parts small quantities of solder or other metal, as may be required. The type $f'$ and $f^2$ on the rim of the wheel are raised or embossed type formed on a thin strip of copper $F^5$, which is next applied to the periphery of the wheel and brazed or soldered thereto with a thin film of brazing compound, which is applied to the inner surface of the copper-type ribbon. The copper type strip or ribbon is very light and adds scarcely any appreciable weight to the type-wheel, while at the same time affording rigid and substantial type for printing and withstanding the blows of the impression-hammer, backed up as the copper-type strip is by the steel rim of the type-wheel and the interposed brazing material or solder uniting the copper-type strip with the rim. After the copper-type strip is applied to the wheel the completed type-wheel is again carefully balanced by removing therefrom or adding thereto small quantities of material at different parts of its circumference, as may be required. The type-wheel thus constructed is substantial, durable, and capable of coöperating with the other parts of my recording-scale without suffering injury, and to accomplish the result of exact, accurate, and rapid weighing and true and correct printing or recording the weights of the loads being weighed.

The paper strip or recording-tape X, upon which the weights are printed or recorded, passes transversely over the type-wheel F and indicator-type $F'$ and beneath the rotatable printing-disk I, having carbon-paper $I'$ on its under surface to cause the type of the type-wheel F and indicator-type $F'$ to make a distinct print or impression on the paper strip or tape X when the impression-hammer H descends.

The impression-hammer H is furnished with an inner soft elastic face $h$, preferably of soft rubber, and an outer hard elastic face $h'$, preferably of hard rubber, the elastic faces h h' being secured to the impression-hammer by clamps h², furnished with screws h³. The impression-hammer H is carried by a lever H', pivoted to the frame at H² and normally held in its elevated position by a trigger or pawl H³, which engages the notched rear end H⁴ of the lever. The impression-hammer is actuated to strike the necessary downward blow against the type-wheel F and pointer F' to cause a print or impression to be made upon the paper strip X by a spring H⁵, attached at one end of the frame and at the other end to the impression-hammer lever by an adjustable screw-bolt H⁶. The trigger H³ is held in position for engaging the lever H' by a spring H⁷. The trigger H³ is released to permit the impression-hammer to descend and cause the weight to be printed upon the paper strip by a hand slide or pull H⁸, furnished with a handle H⁹ and reciprocating in suitable guides H¹⁰ on the frame and which is furnished with a pin or projection H¹¹, that engages the pawl H³. A spring H¹² on the pull-rod H⁸ returns it to position after each impression and automatically lifts the impression-hammer by means of an arm H¹³ on the impression-hammer lever H', which is engaged by a pin or projection H¹⁴ on the pull-rod H⁸.

The paper strip or recording-tape X is automatically fed from the feed reel or spool J to the take-up reel J' by a spring-motor J², preferably comprising a case or frame J³, spring J⁴, shaft J⁵, train of gears J⁶, shaft J⁷, train of gears J⁸, and winding-key J⁹. The paper strip X passes from the feed-spool J over or around the guide-rolls J¹⁰ J¹¹ J¹² J¹³. The spring-motor J² tends to constantly turn the take-up spool J' and does so turn it at the intervals when the notched cam or disk J¹⁵ on the shaft J¹⁶ of the guide-roller J¹³ is released or permitted to turn. The notched cam or disk J¹⁵ is normally held from rotation by a lever J¹⁷, pivoted to the frame at J¹⁸ and held normally in engagement with the notched cam or disk J¹⁵ by a spring J¹⁹. At each depression of the printing-hammer lever H' the lever J¹⁷ is engaged thereby to permit the tape X to automatically feed forward the length necessary for receiving the next impression thereon.

The printing-disk I has a shaft or stud I² and is turned or rotated by the friction of the paper strip X against it as the same feeds forward, a flat spring I³ pressing the paper strip against the rotatable printing-disk, so that the printing-disk and paper strip will move together, thus preventing the printing-disk from smearing the paper. A cord or belt I⁴, preferably a rubber band, passing around a pulley I⁵ on the shaft I² and a pulley I⁶ on the shaft I⁷ of the guide-roller J¹¹, also communicates motion to the printing-disk.

I claim—

1. A combined weight-indicating and weight printing or recording scale, comprising in combination a scale-platform, a scale-beam having an extension or arm secured thereto, a dash-pot cylinder, a piston therein connected to the scale-beam extension or arm and furnished with upwardly and downwardly opening valves, a counterbalance-spring, a rack connected to the scale-beam and counterbalance-spring, a rotatable shaft having a gear meshing with the rack, a weight-printing type-wheel on said shaft, a stationary pointer-mark printing-type adjacent to said type-wheel, a supplemental rack connected with said first-mentioned rack, a rotatable shaft having a gear meshing with said supplemental rack and furnished with a weight-indicator finger, a stationary circular graduated index in coöperative relation with said indicator-finger, an impression-hammer, an impression-hammer lever, a trigger for holding the impression-hammer lever in its elevated position, a spring for actuating the impression-hammer, a hand-slide or pull-rod for raising the impression-hammer lever and releasing the trigger when the scale comes to a true balance, a feed-reel, a take-up reel and guide-rollers for a recording-tape or paper strip, a motor for actuating the take-up reel, a notched cam or disk and lever mechanism for controlling the forward feed of the paper strip by the action of the impression-hammer lever, a carbon or printing disk interposed between the paper strip and the impression-hammer; whereby the weight of the load being weighed may be both indicated to the attendant and printed or recorded on the paper strip, substantially as specified.

2. In a combined weight-indicating and weight printing or recording scale, the combination with a scale-beam, of a dash-pot cylinder having a piston connected to the scale-beam and furnished with upwardly and downwardly opening valves, a counterbalance-spring connected to the scale-beam, a rack actuated by the movement of the scale-beam, a type-wheel having a shaft furnished with a gear meshing with said rack, a stationary pointer-mark type adjacent to said wheel, an impression-hammer, a weight-indicator finger actuated by the scale-beam, and a stationary circular graduated index coöperating with said indicator-finger, an impression-hammer lever, a trigger for holding the impression-hammer lever in its elevated position, a spring for actuating the impression-hammer, and a pull-rod for releasing said trigger, substantially as specified.

3. In a combined weight-indicating and weight-recording scale, the combination with a scale-beam, of a dash-pot cylinder having a piston connected with the scale-beam and furnished with upwardly and downwardly opening valves, a counterbalance-spring connected to the scale-beam, a rack actuated by the movement of the scale-beam, a type-wheel having a shaft furnished with a gear meshing with said rack, a stationary pointer-mark type adjacent to said wheel, an impression-hammer, a supplemental rack actuated by the scale-beam, a weight-indicator finger having a shaft furnished with a gear meshing with said supplemental rack, and a stationary circular graduated index coöperating with said indicator-finger, substantially as specified.

4. In a combined weight-indicating and weight-recording scale, the combination with a scale-beam, of a dash-pot cylinder having a piston connected with the scale-beam, and furnished with upwardly and downwardly opening valves, a counterbalance-spring connected to the scale-beam, a rack actuated by the movement of the scale-beam, a type-wheel having a shaft furnished with a gear meshing with said rack, a stationary pointer-mark type adjacent to said wheel, an impression-hammer, a supplemental rack actuated by the scale-beam, a weight-indicator finger having a shaft furnished with a gear meshing with said supplemental rack, a stationary circular graduated index coöperating with said indicator-finger, an impression-hammer lever, a trigger for holding the impression-hammer lever in its elevated position, a spring for actuating the impression-hammer, and a pull-rod for releasing said trigger, substantially as specified.

5. In a combined weight-indicating and weight-recording scale, the combination with a scale-beam, of a dash-pot cylinder having a piston connected with the scale-beam and furnished with upwardly and downwardly opening valves, a counterbalance-spring connected to the scale-beam, a rack actuated by the movement of the scale-beam, a type-wheel having a shaft furnished with a gear meshing with said rack, a stationary pointer-mark type adjacent to said wheel, an impression-hammer, a supplemental rack actuated by the scale-beam, a weight-indicator finger having a shaft furnished with a gear meshing with said supplemental rack, a stationary circular graduated index coöperating with said indicator-finger, an impression-hammer lever, a trigger for holding the impression-hammer lever in its elevated position, a spring for actuating the impression-hammer, a pull-rod for releasing said trigger, and a spring for retracting the pull-rod and raising the impression-hammer lever thereby, substantially as specified.

6. In a combined weight-indicating and weight-recording scale, the combination with a scale-beam, of a dash-pot cylinder having a piston connected with the scale-beam and furnished with upwardly and downwardly opening valves, a counterbalance-spring connected to the scale-beam, a rack actuated by the movement of the scale-beam, a type-wheel having a shaft furnished with a gear meshing with said rack, a stationary pointer-mark type adjacent to said wheel, an impression-hammer, a supplemental rack actuated by the scale-beam, a weight-indicator finger having a shaft furnished with a gear meshing with said supplemental rack, a stationary circular graduated index coöperating with said indicator-finger, an impression-hammer lever, a trigger for holding the impression-hammer lever in its elevated position, a spring for actuating the impression-hammer, a pull-rod for releasing said trigger, a spring for retracting the pull-rod and raising the impression-hammer lever thereby, a feed-reel, take-up reel, guide-rollers for a paper strip, and means for feeding the paper strip from the feed-reel to the take-up reel, substantially as specified.

7. In a combined weight-indicating and weight-recording scale, the combination with a scale-beam, of a dash-pot cylinder having a piston connected with the scale-beam and furnished with upwardly and downwardly opening valves, a counterbalance-spring connected to the scale-beam, a rack actuated by the movement of the scale-beam, a type-wheel having a shaft furnished with a gear meshing with said rack, a stationary pointer-mark type adjacent to said wheel, an impression-hammer, a supplemental rack actuated by the scale-beam, a weight-indicator finger having a shaft furnished with a gear meshing with said supplemental rack, a stationary circular graduated index coöperating with said indicator-finger, an impression-hammer lever, a trigger for holding the impression-hammer lever in its elevated position, a spring for actuating the impression-hammer, a pull-rod for releasing said trigger, a spring for retracting the pull-rod and raising the impression-hammer lever thereby, a feed-reel, take-up reel, guide-rollers for a paper strip, means for feeding the paper strip from the feed-reel to the take-up reel, and a notched cam and lever for controlling the forward feed of the paper strip by the action of the impression-hammer lever, substantially as specified.

8. In a combined weight-indicating and weight-recording scale, the combination with a scale-beam, of a dash-pot cylinder having a piston connected with the scale-beam and furnished with upwardly and downwardly opening valves, a counterbalance-spring connected to the scale-beam, a rack actuated by the movement of the scale-beam, a type-wheel having a shaft furnished with a gear meshing with said rack, a stationary pointer-mark type adjacent to said wheel, an impression-hammer, a supplemental rack actuated by the scale-beam, a weight-indicator finger having a shaft furnished with a gear meshing with said supplemental rack, a stationary circular graduated index coöperating with said indicator-finger, an impression-hammer lever, a trigger for holding the impression-hammer lever in its elevated position, a spring for actuating the impression-hammer, a pull-rod for releasing said trigger, a spring for retracting the pull-rod and raising the impression-hammer lever thereby, a feed-reel, take-up reel, guide-rollers for a paper strip, means for feeding the paper strip from the feed-reel to the take-up reel, a notched cam and lever for controlling the forward feed of the paper strip by the action of the impression-hammer lever, and a printing-disk interposed between the impression-hammer and the paper strip, substantially as specified.

9. In a combined weight-indicating and weight-recording scale, the combination with a scale-beam, of a dash-pot cylinder having a piston connected with the scale-beam and furnished with upwardly and downwardly opening valves, a counterbalance-spring connected to the scale-beam, a rack actuated by the movement of the scale-beam, a type-wheel having a shaft furnished with a gear meshing with said rack, a stationary pointer-mark type adjacent to said wheel, an impression-hammer, a supplemental rack actuated by the scale-beam, a weight-indicator finger having a shaft furnished with a gear meshing with said supplemental rack, a stationary circular graduated index coöperating with said indicator-finger, an impression-hammer lever, a trigger for holding the impression-hammer lever in its elevated position, a spring for actuating the impression-hammer, a pull-rod for releasing said trigger, a spring for retracting the pull-rod and raising the impression-hammer lever thereby, a feed-reel, take-up reel, guide-rollers for the paper strip, means for feeding the paper strip from the feed-reel to the take-up reel, a notched cam and lever for controlling the forward feed of the paper strip by the action of the impression-hammer lever, a printing-disk interposed between the impression-hammer and the paper strip, and a spring for pressing the paper strip against the printing-disk and causing the printing-disk to turn by the movement of the paper strip, substantially as specified.

10. The combination with a scale-beam, of a dash-pot cylinder having a piston connected to the scale-beam and furnished with upwardly and downwardly opening valves, a counterbalance-spring connected with the scale-beam, a weight-indicator finger having a shaft furnished with a gear, a rack meshing with said gear and actuated by the scale-beam, a stationary graduated circular index, a rotatable type-wheel actuated by movement of the scale-beam, a stationary pointer-mark type and an impression-hammer, an impression-hammer lever, a trigger for holding the impression-hammer lever in its elevated position, a spring for actuating the impression-hammer, and a pull-rod for releasing said trigger, substantially as specified.

11. The combination with a scale-beam, of a dash-pot cylinder having a piston connected to the scale-beam and furnished with upwardly and downwardly opening valves, a counterbalance-spring connected with the scale-beam, a weight-indicator finger having a shaft furnished with a gear, a rack meshing with said gear and actuated by the scale-beam, a stationary graduated circular index, a rotatable type-wheel actuated by movement of the scale-beam, an impression-hammer, an impression-hammer lever, a movable trigger for holding the impression-hammer lever in its elevated position, a spring for actuating the impression-hammer lever, and a hand-operated device for releasing the impression-hammer lever, substantially as specified.

12. The combination with a scale-beam, of a dash-pot cylinder having a piston connected to the scale-beam and furnished with upwardly and downwardly opening valves, a counterbalance-spring connected with the scale-beam, a weight-indicator finger having a shaft furnished with a gear, a rack meshing with said gear and actuated by the scale-beam, a stationary graduated circular index, a rotatable type-wheel actuated by movement of the scale-beam, an impression-hammer, an impression-hammer lever, a movable trigger for holding the impression-hammer lever in its elevated position, a spring for actuating the impression-hammer lever, a hand-operated device for releasing the impression-hammer lever, and a spring for retracting said hand-operated device and raising the impression-hammer lever, substantially as specified.

13. In a recording-scale, the combination with a scale-beam and a type-wheel connected with and operated by the scale-beam, of an impression-hammer, an impression-hammer lever provided with an arm for raising the same, a trigger for holding said lever in its elevated position, a spring for depressing said lever, a hand-operated device for releasing the trigger, and a spring for releasing said hand-operated device and raising the impression-hammer, substantially as specified.

14. In a recording-scale, the combination with a scale-beam and a type-wheel connected with and operated thereby, of a paper-strip-feed mechanism, and a rotatable printing-disk turned by the forward feed of the paper strip, substantially as specified.

15. In a recording-scale, the combination with a scale-beam and a type-wheel connected with and operated thereby, of a paper-strip feed mechanism, a rotatable printing-disk turned by the forward feed of the paper strip, and a flat spring for pressing the paper strip against the printing-disk, substantially as specified.

16. In a recording-scale, the combination with a scale-beam and a type-wheel connected with and operated thereby, of a paper-strip-feed mechanism, a rotatable printing-disk turned by the forward feed of the paper strip, an impression-hammer and impression-hammer lever, and a notched cam and lever to control the feed of the paper strip from the impression-hammer lever, substantially as specified.

17. In a recording-scale, the combination with a scale-beam and spring-counterbalance connected therewith, of a type-wheel connected with and actuated by the scale-beam, and comprising a metal rim, a metal hub having screw-threaded spoke-flanges at each end thereof, light metal spokes furnished each with a shouldered end riveted to said rim and provided with screw-threaded inner ends threaded in the flanges of the hub, said metallic rim having a thin copper type-strip secured thereto, substantially as specified.

18. In a recording-scale, the combination with a scale-beam and spring-counterbalance connected therewith, of a type-wheel connected with and actuated by the scale-beam, and comprising a metal rim, a metal hub having screw-threaded spoke-flanges at each end thereof, light metal spokes furnished each with a shouldered end riveted to said rim and provided with screw-threaded inner ends threaded in the flanges of the hub, said metallic rim having a thin copper type-strip secured thereto, and jam-nuts on the threaded inner ends of said spokes engaging the flanges of the hub, substantially as specified.

19. In a recording-scale, a type-wheel comprising a metallic hub $F^3$ having screw-threaded spoke-flanges furnished with screw-threaded holes at each end thereof, of umbrella-rib spokes $F^4$ furnished with rivet-pins $f^7$ at their outer ends, and screw-threaded pins $f^{10}$ at their inner ends, and a metal rim $F^2$ to which the rivet-pins of the spokes are secured, substantially as specified.

20. In a recording-scale, a type-wheel comprising a metallic hub $F^3$ having screw-threaded spoke-flanges furnished with screw-threaded holes at each end thereof, of umbrella-rib spokes $F^4$ furnished with rivet-pins $f^7$ at their outer ends, and screw-threaded pins $f^{10}$ at their inner ends, a metal rim $F^2$ to which the rivet-pins of the spokes are secured, and a soft-metal type-strip secured on the outer face of said rim, substantially as specified.

21. In a recording-scale, a type-wheel comprising a metallic hub $F^3$ having spoke-flanges furnished with screw-threaded holes at each end thereof, of umbrella-rib spokes $F^4$ furnished with rivet-pins $f^7$ at their outer ends and screw-threaded pins $f^{10}$ at their inner ends, a metal rim $F^2$ to which the rivet-pins of the spokes are secured, a soft-metal type-strip secured on the outer face of said rim, and jam-nuts $f^{11}$, substantially as specified.

22. In a weight-indicating and weight-recording scale, the combination with a scale-beam, a dash-pot cylinder and piston, a counterbalance-spring, a rack, a rotatable shaft furnished with a gear meshing with said rack, a rotatable weight-indicator finger, a graduated index therefor, a type-wheel, and an impression-hammer, a trigger for holding said lever in its elevated position, a spring for depressing said lever, and a pull-rod for returning the trigger, substantially as specified.

23. In a weight-indicating and weight-recording scale, the combination with a scale-beam, a dash-pot cylinder and piston, a counterbalance-spring, a rack, a rotatable shaft furnished with a gear meshing with said rack, a rotatable weight-indicator finger, a graduated index therefor, a type-wheel, an impression-hammer, and a stationary pointer-mark type, an impression-hammer, a trigger for holding said lever in its elevated position, a spring for depressing said lever, and a pull-rod for returning the trigger, substantially as specified.

24. In a weight-indicating and weight-recording scale, the combination with a scale-beam, a dash-pot cylinder and piston, a counterbalance-spring, a rack connected with the scale-beam, a rotatable shaft furnished with a gear meshing with said rack, a rotatable weight-indicator finger on said shaft, a graduated index therefor, a type-wheel connected with and actuated by the scale-beam, an impression-hammer, a stationary pointer-mark type adjacent to said type-wheel, a paper-strip-feed mechanism, and a printing-disk, substantially as specified.

25. The combination with a scale-beam, of a type-wheel below the scale-beam connected therewith and actuated thereby, and a weight-indicator finger above said scale-beam connected with and actuated thereby, substantially as specified.

26. The combination with a scale-beam, of a type-wheel below the scale-beam connected therewith and actuated thereby, a weight-indicator finger above said scale-beam connected with and actuated thereby, and a dash-pot cylinder having a piston connected with and actuated by the scale-beam, substantially as specified.

27. The combination with a scale-beam, of a type-wheel below the scale-beam connected therewith and actuated thereby, a weight-indicator finger above said scale-beam connected with and actuated thereby, a dash-pot cylinder having a piston connected with and actuated by the scale-beam, and furnished with upwardly and downwardly opening valves, substantially as specified.

28. The combination with a scale-beam, of a type-wheel below the scale-beam connected therewith and actuated thereby, a weight-indicator finger above said scale-beam connected with and actuated thereby, a dash-pot cylinder having a piston connected with and actuated by the scale-beam and furnished with upwardly and downwardly opening valves, and light flat springs for holding the valves closed, substantially as specified.

29. The combination with a scale-beam and a type-wheel connected therewith and actuated thereby, of an impression-hammer, an impression-hammer lever, a trigger for holding the impression-hammer lever in its elevated position, a spring for actuating the impression-hammer lever to strike the impression-hammer against the type-wheel, a hand-operated device for releasing said trigger, said impression-hammer lever having an arm engaged by said hand-operated device on its backward movement to raise the impression-hammer, substantially as specified.

30. The combination with a scale-beam and a type-wheel connected therewith and actuated thereby, of an impression-hammer, an impression-hammer lever, a trigger for holding the impression-hammer lever in its elevated position, a spring for actuating the impression-hammer lever to strike the impression-hammer against the type-wheel, a hand-operated device for releasing said trigger, said impression-hammer lever having an arm engaged by said hand-operated device on its backward movement to raise the impression-hammer, and a spring for releasing said hand-operated device, substantially as specified.

31. The combination with a scale-beam and a type-wheel connected therewith and actuated thereby, of an impression-hammer, an impression-hammer lever, a trigger for holding the impression-hammer lever in its elevated position, a spring for actuating the impression-hammer lever to strike the impression-hammer against the type-wheel, a hand-operated device for releasing said trigger, said impression-hammer lever having an arm engaged by said hand-operated device on its backward movement to raise the impression-hammer, a spring for releasing said hand-operated device on its backward movement, a paper-strip-feed mechanism, a notched cam, and a lever engaging the impression-hammer lever to control the paper-feed, substantially as specified.

GEORGE GOETZ.

Witnesses:
 H. M. MUNDAY,
 P. ABRAMS.